(12) United States Patent
Lam

(10) Patent No.: US 11,579,469 B2
(45) Date of Patent: Feb. 14, 2023

(54) BLUE LIGHT BLOCKING EYEWEAR AND METHOD OF USE

(71) Applicant: James Lam, Richmond, TX (US)

(72) Inventor: James Lam, Richmond, TX (US)

( * ) Notice: Subject to any disclaimer, the term of this patent is extended or adjusted under 35 U.S.C. 154(b) by 239 days.

(21) Appl. No.: 16/714,613

(22) Filed: Dec. 13, 2019

(65) Prior Publication Data

US 2020/0192125 A1 Jun. 18, 2020

Related U.S. Application Data

(60) Provisional application No. 62/779,123, filed on Dec. 13, 2018.

(51) Int. Cl.
*G02C 7/10* (2006.01)

(52) U.S. Cl.
CPC ............. *G02C 7/104* (2013.01); *G02C 7/105* (2013.01); *G02C 7/108* (2013.01)

(58) Field of Classification Search
CPC ......... G02C 7/104; G02C 7/105; G02C 7/108
USPC ...................................................... 351/41, 44
See application file for complete search history.

(56) References Cited

U.S. PATENT DOCUMENTS

| | | | | |
|---|---|---|---|---|
| 4,253,746 A * | 3/1981 | Phillips | .................... | G02C 7/06 351/159.41 |
| 5,710,613 A * | 1/1998 | Hughes | .................... | G02C 7/10 351/45 |
| 7,195,350 B2 * | 3/2007 | Kurzrok | .................... | G02C 7/12 351/44 |
| 7,506,976 B2 * | 3/2009 | Baiocchi | .................. | G02C 7/12 351/49 |

* cited by examiner

*Primary Examiner* — Tuyen Tra
(74) *Attorney, Agent, or Firm* — Leavitt Eldredge Law Firm

(57) ABSTRACT

An eyewear includes an eyewear frame; and two lenses held in place via the eyewear frame, each of the two lenses having a top portion composed of a clear polycarbonate; and a bottom portion integral with the top portion and composed of an orange polycarbonate; the bottom portion absorbs blue light and the top portion allows all light through.

3 Claims, 4 Drawing Sheets

BLUE LIGHT BLOCKING EYEWEAR AND METHOD OF USE

BACKGROUND

1. Field of the Invention

The present invention relates generally to eyewear systems, and more specifically, to a blue light blocking eyewear for use with electronic devices.

2. Description of Related Art

Eyewear systems are well known in the art and are effective means to block sunlight, improve vision, and protect the wearer's eyes. For example, FIG. 1 depicts a conventional eyewear 101 having a frame 103 supporting clear lenses 105, 107. Eyewear 101 may be useful to improve the user's vision.

One of the problems commonly associated with eyewear 101 is limited use. For example, the eyewear 101 does not aid in protecting the wearer's eyes from blue light emitted from electronics. It is desirable to block blue light for a variety of reasons. Blue light is a high energy visible light that packs more energy than other light waves and penetrates all the way to the back of the eye (the retina). Excessive exposure to blue light can cause harmful effects to the eye.

Accordingly, although great strides have been made in the area of eyewear, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
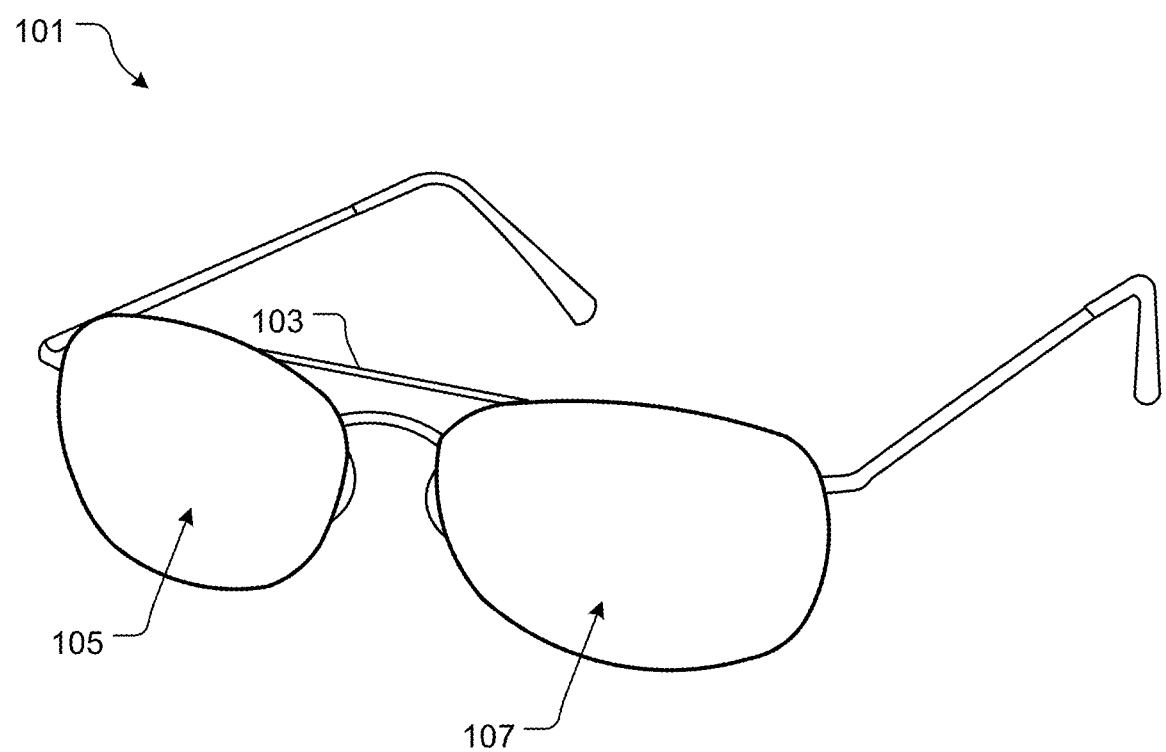
FIG. 1 is an isometric view of a common eyewear.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional eyewear. Specifically, the present invention provides for eyewear having lenses that include an orange portion, thereby providing lenses that the user can wear, tilt their head, and either utilize a clear portion or the orange tinted portion to block blue light during electronic use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
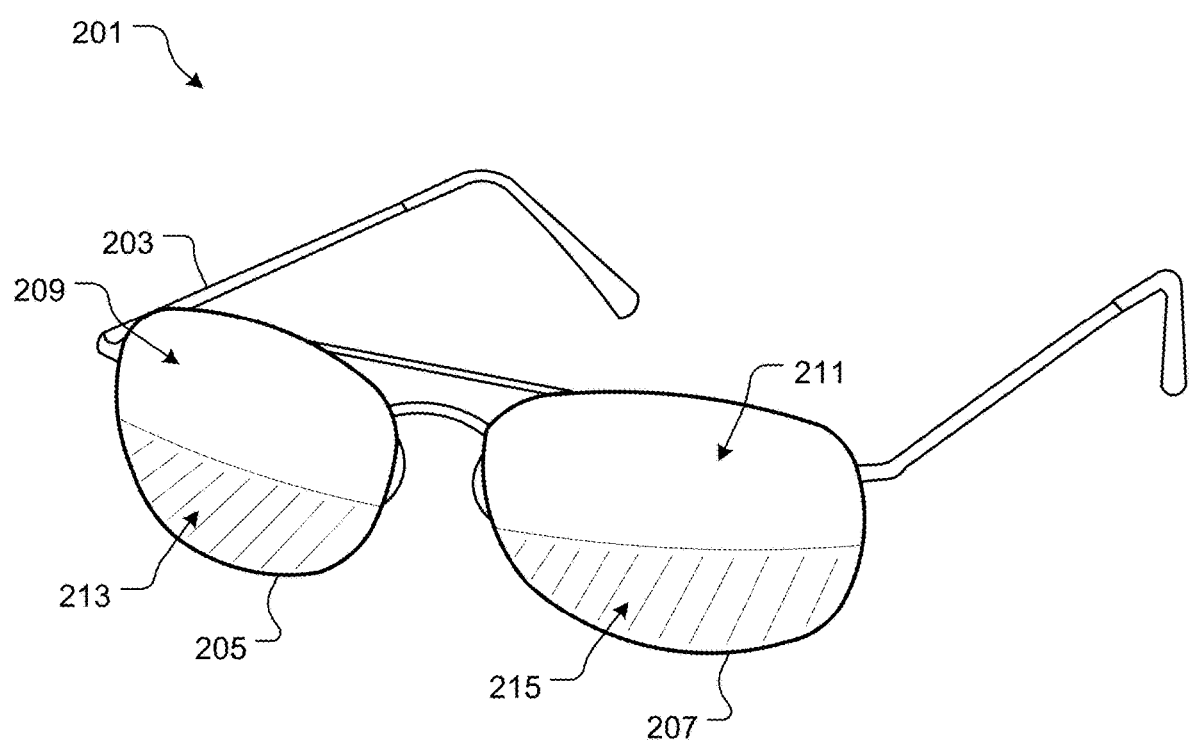
FIG. 2 is an isometric view of a blue light blocking eyewear in accordance with a preferred embodiment of the present application.

Referring now to the drawings wherein like reference characters identify corresponding or similar elements throughout the several views, FIG. 2 depicts an isometric view of a blue light blocking eyewear 201 in accordance with a preferred embodiment of the present application. It will be appreciated that eyewear 201 overcomes one or more of the above-listed problems commonly associated with conventional eyewear.

In the contemplated embodiment, eyewear 201 includes a frame 203 supporting two lenses 205, 207. Each lens has a top portion 209, 211 composed of clear polycarbonate and a bottom portion 213, 215 composed of an orange polycarbonate. It should be appreciated that the top and bottom of each lens are fused together in a seamless fashion, thereby providing for visibility through the entire lens seamlessly. However, alternative embodiments contemplate use of a film or other exterior layer to be added to a lens to provide for the blue light blocking functionality. It should further be appreciated that the eyewear can be a frameless style, still having a structural component to support the lenses.

It should be appreciated that one of the unique features believed characteristic of the present application is the bottom orange portion of the lens. This provides for eyewear that can be utilized with the orange portion to block blue light, and also provides for a clear portion that can be utilized when the user desires to have full visibility. This allows for the user to use a single pair of glasses for multiple uses. It should be appreciated that blue light can come from electronics, phones, the sun, and is essentially everywhere.

It should be appreciated that the lens can vary in shape and size, and further can include prescriptions or the like depending on the needs of the user.

Figure 3:
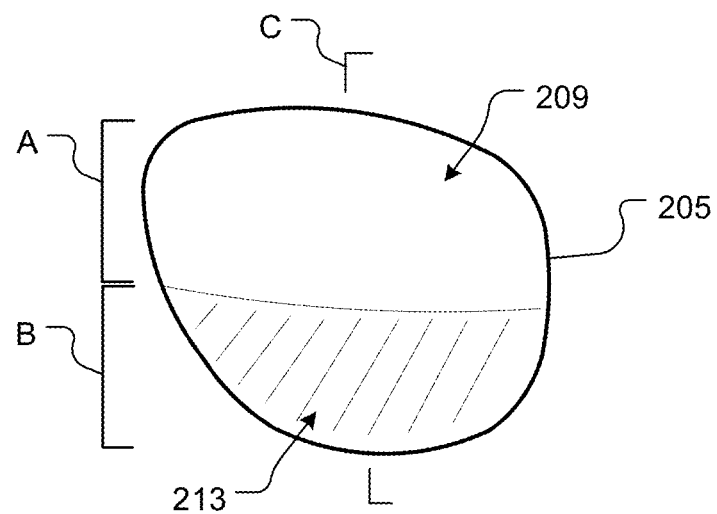
FIG. 3 is a front view of a lens of FIG. 2.

In FIG. 3, one embodiment of a lens 205 is shown, wherein the top portion 209 is clear and the bottom portion 213 is orange. In this embodiment, the length of the top and bottom portions (A, B) are approximately equal. However, it is contemplated that the length can vary. It should be appreciated that in all embodiments, the bottom portion is orange, as having the top orange would not be ergonomically appealing for the user. It should further be appreciated that the bottom portion can vary in intensity of orange.

Figure 4:
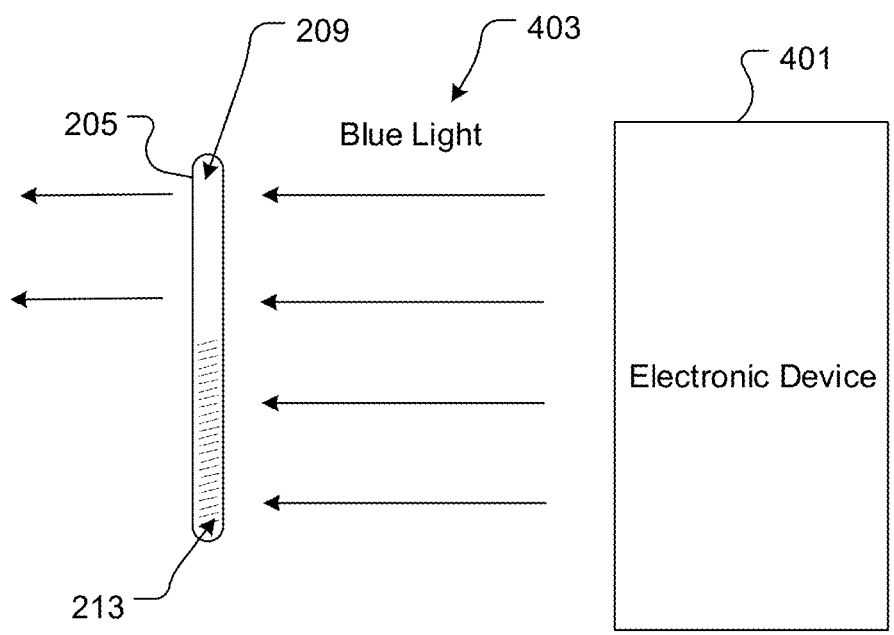
FIG. 4 is a side diagram of the lens of FIG. 3 in use with an electronic device.

In FIG. 4, a side cross sectional view taken from line C of FIG. 2 of lens 205 is shown in use with an electronic device 401. As shown, during use, the user can wear the eyewear and use an electronic device. The electronic device 401 will emit blue light 403 which will pass through the clear top portion 209 but be blocked by the bottom orang portion 211. It should be appreciated that the user can merely tilt their head backwards to make sure they are viewing the electronic device through the orange portion. It should further be appreciated that the lenses are composed of colored and clear polycarbonate, as opposed to a surface film or the like. This ensures that the orange color is disposed through a thickness of the lens and provides for optimal blue light blocking.

Figure 5:
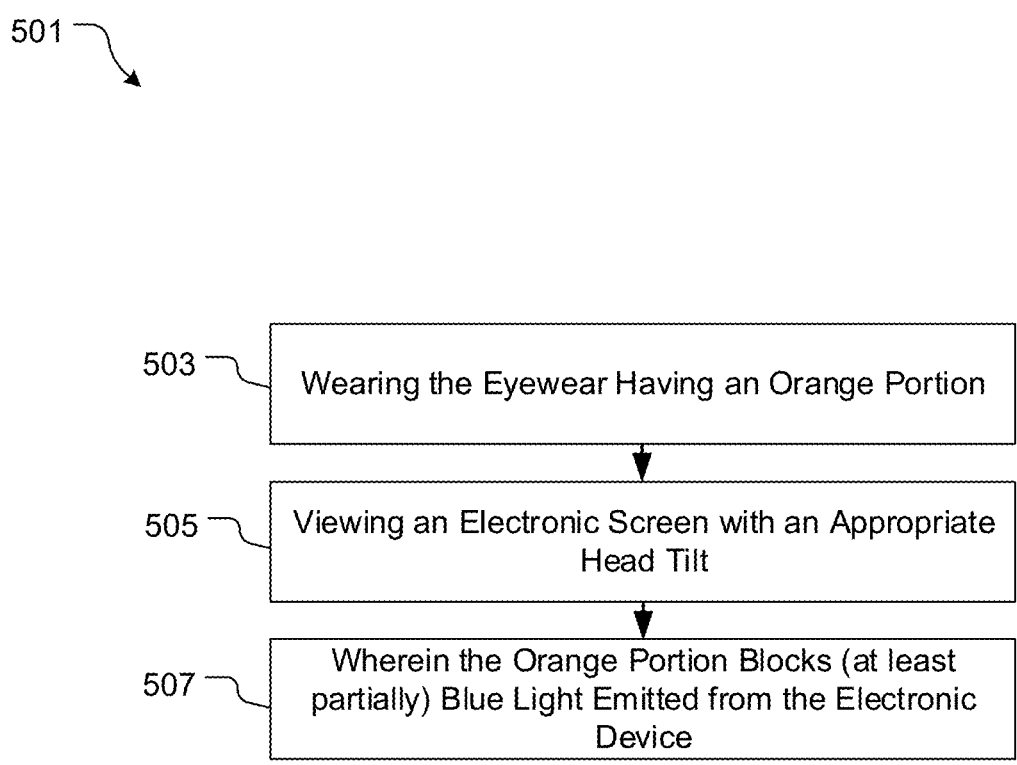
FIG. 5 is a flowchart of a method of use of the eyewear of FIG. 2.

In FIG. 5, a flowchart 501 depicts a method of use of eyewear 201. During use, the user will wear the eyewear and view an electronic device, such as a TV, a smart phone, or a computer, wherein the bottom orange portion of the lenses block blue light from reaching the user's eyes, as shown with boxes 503, 505, 507.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An eyewear, comprising:
   an eyewear frame; and
   two lenses held in place via the eyewear frame, each of the two lenses having:
      a top portion composed of a clear polycarbonate; and
      a bottom portion having a thickness and integral with the top portion, the bottom portion is composed of an orange polycarbonate material configured to absorb a blue light, the thickness is composed solely of the orange polycarbonate material;
   wherein the bottom portion absorbs the blue light emitted from an electronic device and the top portion allows the blue light therethrough.

2. The eyewear of claim 1, wherein the top portion and bottom portion are seamlessly fused together.

3. The eyewear of claim 1, wherein the bottom portion has a length approximately equal to a length of the top portion.

* * * * *